United States Patent
Franceschini

(10) Patent No.: US 9,121,506 B2
(45) Date of Patent: Sep. 1, 2015

(54) LEAF SEAL

(71) Applicant: ROLLS-ROYCE PLC, London (GB)

(72) Inventor: Gervas Franceschini, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 14/317,704

(22) Filed: Jun. 27, 2014

(65) Prior Publication Data
US 2015/0001805 A1 Jan. 1, 2015

(30) Foreign Application Priority Data

Jun. 28, 2013 (GB) .................................. 1311612.4

(51) Int. Cl.
F16J 15/32 (2006.01)
F02C 7/28 (2006.01)

(52) U.S. Cl.
CPC .............. F16J 15/3292 (2013.01); F02C 7/28 (2013.01)

(58) Field of Classification Search
CPC ................................................... F16J 15/3292
USPC ....................................................... 277/355
See application file for complete search history.

(56) References Cited

U.S. PATENT DOCUMENTS

| 2008/0007009 A1* | 1/2008 | Williams ..................... 277/355 |
| 2008/0048399 A1* | 2/2008 | Nicholson et al. ............ 277/355 |
| 2009/0322035 A1* | 12/2009 | Wright ........................ 277/431 |
| 2010/0007093 A1* | 1/2010 | Grondahl ..................... 277/500 |
| 2012/0007318 A1* | 1/2012 | Lee et al. .................... 277/411 |
| 2013/0154199 A1* | 6/2013 | Williams ..................... 277/549 |
| 2013/0320627 A1* | 12/2013 | Nasti et al. .................. 277/355 |
| 2014/0070496 A1* | 3/2014 | Jahn et al. ................... 277/355 |

FOREIGN PATENT DOCUMENTS

| EP | 1777445 A1 | 4/2007 |
| EP | 2 532 838 A1 | 12/2012 |
| GB | 1 309 579 | 3/1973 |
| GB | 2462255 A | 2/2010 |
| WO | WO 2006/016098 A1 | 2/2006 |

OTHER PUBLICATIONS

Search Report issued in British Application No. 1311612.4 issued Nov. 14, 2013.
Apr. 10, 2015 Search Report issued in European Application No. 14 17 4648.

* cited by examiner

Primary Examiner — Gilbert Lee
(74) Attorney, Agent, or Firm — Oliff PLC

(57) ABSTRACT

This application describes a leaf seal arrangement, including: a first component having a high pressure area and a low pressure area therein; a second component which passes from the high pressure area to the low pressure area; a leaf seal having an array of leaf elements between the high and low pressure areas, each leaf element having a fixed end and a free end, wherein the fixed end is attached to the first component and the free end defines a sealing surface through which the second component sealably passes, a sealing gap therebetween, and wherein the sealing gap generally converges from the high pressure area toward the lower pressure area. Also described is a method of providing a leaf seal.

15 Claims, 6 Drawing Sheets

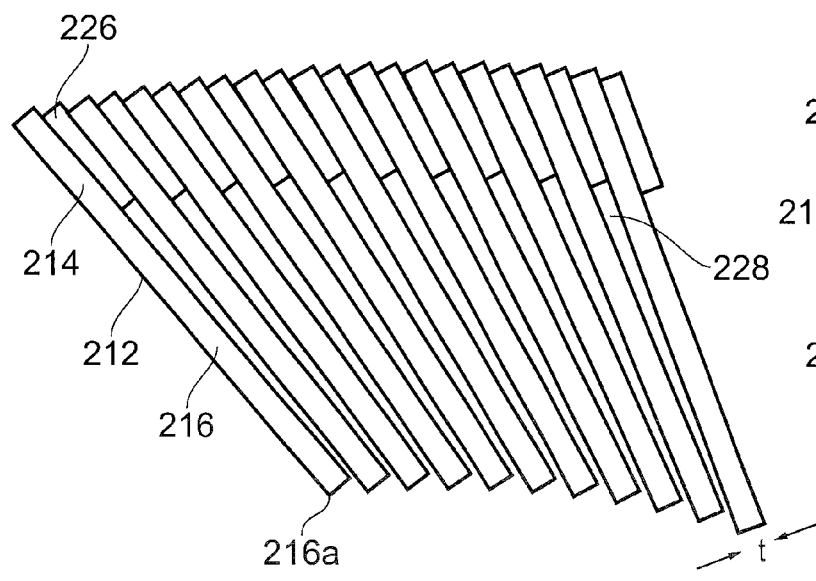 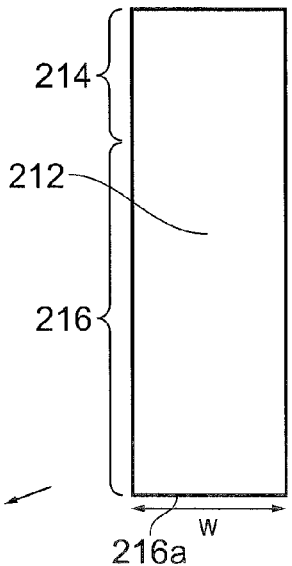
FIG. 3a    FIG. 3b
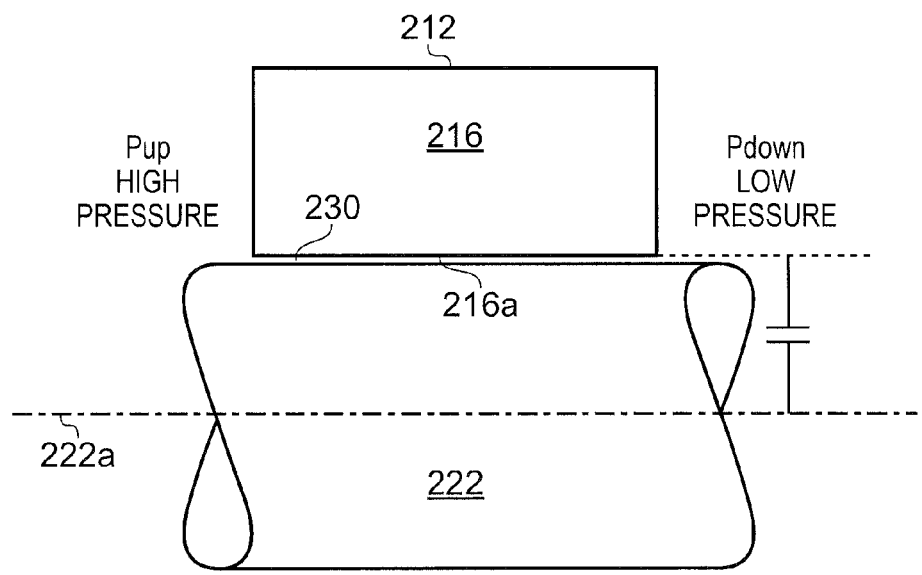
FIG. 4a

LEAF SEAL

TECHNICAL FIELD OF INVENTION

This invention relates to a leaf seal. In particular, a leaf seal which is configured to generate hydrostatic lift under normal operating conditions. The leaf seal may find particular use in a gas turbine engine where sealing is required to accommodate transitory deflections of relatively rotating components which are experienced in normal use.

BACKGROUND OF INVENTION

With reference to FIG. 1, a ducted fan gas turbine engine which may incorporate the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through and drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The engine may have one or more seals installed, for example, between an interconnecting shaft and a casing for the shaft. Such seals may be so-called leaf seals.

Generally, leaf seals are used to form a seal between two relatively rotating components in order to provide a pressure barrier which defines high and low pressure areas. In the case of a gas turbine engine this helps restrict the leakage of air or fluid from particular areas of the engine. The pressure barrier is provided with a large number of typically rectangular leaves which are held at a defined angle to the radial around the seal circumference. The leaves are flexible and allow radial compliance which can accommodate changes in the radial position of the two relatively rotating components. The leaves are packed at a sufficient density to provide an effective pressure barrier but the use of leaves inevitably leads to interleaf gaps and porosity across the seal.

FIG. 2 shows a schematic perspective cut-away view of a portion of a typical leaf seal 210 comprising a pack of leaves 212. FIG. 3a shows an end view of a segment of a leaf seal 210 viewed along the axis of rotation of a rotating shaft 222. FIG. 3b shows a face view of a single leaf 212.

Each leaf 212 is in the form of a plate, each having a root end 214, a free end 216, axial width, w, and a thickness, t. The leaves 212 alternate with spacer elements 226 at the root end 214 and are secured to a backing ring 219 of a housing 218, which typically also comprises front 220 (high pressure side) and rear 221 (low pressure side) rigid annular cover plates. The free ends 216 of the leaves 212 present end edges 216a towards a surface of a rotating component 222 (shaft) generally rotating in the direction depicted by arrowhead 224. The leaves 212, and in particular the free end edges 216 of the leaves 212, act against the surface in order to create a seal across the assembly. Each leaf 212 is sufficiently compliant in order to radially adjust with rotation of the surface 222, so that a good sealing effect is created and maintained during use. The spacers 226 ensure that flexibility is available to appropriately present the leaves 212 towards the surface which, as illustrated, is generally with an inclined angle between them. The spacers 226 also help to form interleaf gaps 228 between adjacent working portions of the leaves 212. An axial leakage flow through these gaps 228 is induced by the pressure differential across the seal 210.

Generally, leaf seals can be designed such that the expected axial leakage flow determines the extent of the contact between the leaf elements and the rotating component. Thus, the leakage flow can contribute to leaf blow-down where the free end edges are urged radially inwards so as to bear on the rotor surface. Or blow-up forces which act to lift the leaf elements, thereby reducing the contact pressure but increasing the leakage flow. A limited amount of blow-down can be the more desirable to create a good seal between the free end edges and the surface, but excessive blow-down causes excessive rotor loading and wear in the seal and rotor. The wear of the end edges and/or the rotor can limit the usable life of the seal.

Various configurations of leaf seal have been proposed to help control the amount of blow-down. One example of this is described in WO06016098 which implements a leaf with an edge chamfer and an associated feature on the opposing cover plate, the separation of the two defines a control gap which is dependent on the radial deflection of a leaf.

A further complication in the design of leaf seals is brought about by the variance in the operating conditions. This variance is determined by many factors including but not limited by thermal expansion (differential and single bodied), operating pressures, mechanical tolerances and vibration. One particular issue of concern to this invention are variables which lead to a misalignment between the two components which are bridged by the seal.

The present invention seeks to provide an improved leaf seal which addresses some of the issues presented by having a misalignment.

STATEMENTS OF INVENTION

In a first aspect, the invention provides a leaf seal arrangement, comprising: a first component having a high pressure area and a low pressure area therein; a second component which passes from the high pressure area to the low pressure area; a leaf seal having an array of leaf elements between the high and low pressure areas, each leaf element having a fixed end and a free end, wherein the fixed end is attached to the first component and the free end defines a sealing surface through which the second component sealably passes, a sealing gap therebetween, and wherein the sealing gap generally converges from the high pressure area toward the lower pressure area. The convergent portion extends across between 60% and 100% the width of the sealing surface.

Providing a convergent sealing gap which is larger towards the upstream or high pressure side of the seal ensures there is a relatively consistent hydrostatic uplift on the leaf elements can be achieved which can provide more reliable sealing and increase the longevity of the leaf seal.

The angle of the convergence may be between 1 degree and 20 degrees. The angle of convergence may be between 1 and 10 degrees. Preferably, the angle of convergence will be between 1 and 5 degrees. By angle of convergence it is meant the angle between two lines which extend from the narrowest portion of the sealing gap and the widest portion of the sealing gap. The convergence is provided between the leaf element tip and the second component. The convergence may be provided by a shaped leaf element or a shaped second component. For example, the leaf element edge which provides the sealing gap may have a tapered or curved profile. Alternatively or additionally, the second component may include one or more features which provide a curved or angled surface relative to the leaf element edge at the sealing gap.

The second component may be rotatably mounted relative to the first component and define a neutral rotational axis. The sealing gap may be tapered. The angle of taper may be between 1 degree and 20 degrees. The angle of taper may be between 1 and 10 degrees. Preferably, the angle of taper is between 1 and 5 degrees. The angle of taper may be relative to the neutral rotational axis.

The leaf elements may have an axial width between the high pressure area and the low pressure area. Alternatively, the convergent portion may extend across between 75% and 100%.

The sealing gap may converge at a constant rate.

The sealing gap may include more than one convergent portion. Each portion may have different rates of convergence.

The first portion may extend from a downstream portion of the leaf element and may be inclined to the neutral rotational axis by an angle $\alpha_1$ which is in the range bounded by 1 degree and 30 degrees. The second portion may extend from the first portion and may be inclined to the neutral rotational axis by an angle $\alpha_2$ which is greater than or equal to $\alpha_1$ and in the range bounded by 1 degree and 30 degrees. Alternatively, the angles $\alpha_1$ and $\alpha_2$ may be between 1 degree and 20 degrees, between 1 and 10 degrees, or, preferably, between 1 and 5 degrees.

The profile of the leaf of the first or second portion may not be straight and the angles $\alpha_1$ and $\alpha_2$ may be defined by lines which extend from the respective upstream and downstream gaps of the upstream and downstream portions.

The leaf seal may further comprise a non-convergent portion. The non-convergent portion may be a downstream portion. The non-convergent portion may be provided by a portion in which the leaf element edge and second component are parallel to each other.

The non-convergent portion may extend across less than 20% of the axial width of the leaf element.

The leaf seal may comprise circumferential portions of convergent sealing gap and circumferential portions of non-convergent sealing gap.

The convergent sealing gap may be at least partially defined by tapered profile on the second component.

The leaf seal may be suitable for use in a gas turbine engine.

In a second related aspect, the invention provides a gas turbine engine including the leaf seal of the first aspect.

In a third aspect, there is a method of providing a leaf seal for defining a high pressure area and a low pressure area in a first component in which a second component passes from the high pressure area to the low pressure area; the leaf seal having an array of leaf elements, each leaf element having a fixed end and a free end, wherein the fixed end is attached to the first component and the free end defines a sealing surface through which the second component sealably passes, a sealing gap therebetween, and wherein the sealing gap generally converges from the high pressure area toward the lower pressure area, the method comprising: determining the expected amount of deflection which will be experienced between the first and second components at the sealing gap during normal operation; determining a required amount of convergence in the sealing gap to accommodate the expected amount of deflection; configuring either or both of the leaf seal and the second component to provide the required convergence.

The required convergence may be greater than the expected deflection.

The sealing gap may be configured to provide positive hydrostatic lift under all normal operating conditions.

DESCRIPTION OF DRAWINGS

Embodiments of the invention will now be described with the aid of the following drawings of which:

FIGS. 3a and 3b show respective axial and circumferential sectional views of a typical leaf seal.
FIGS. 4a-c show a conventional leaf seal with a rotary component in various states of axial alignment.

DETAILED DESCRIPTION OF INVENTION

Figure 1:
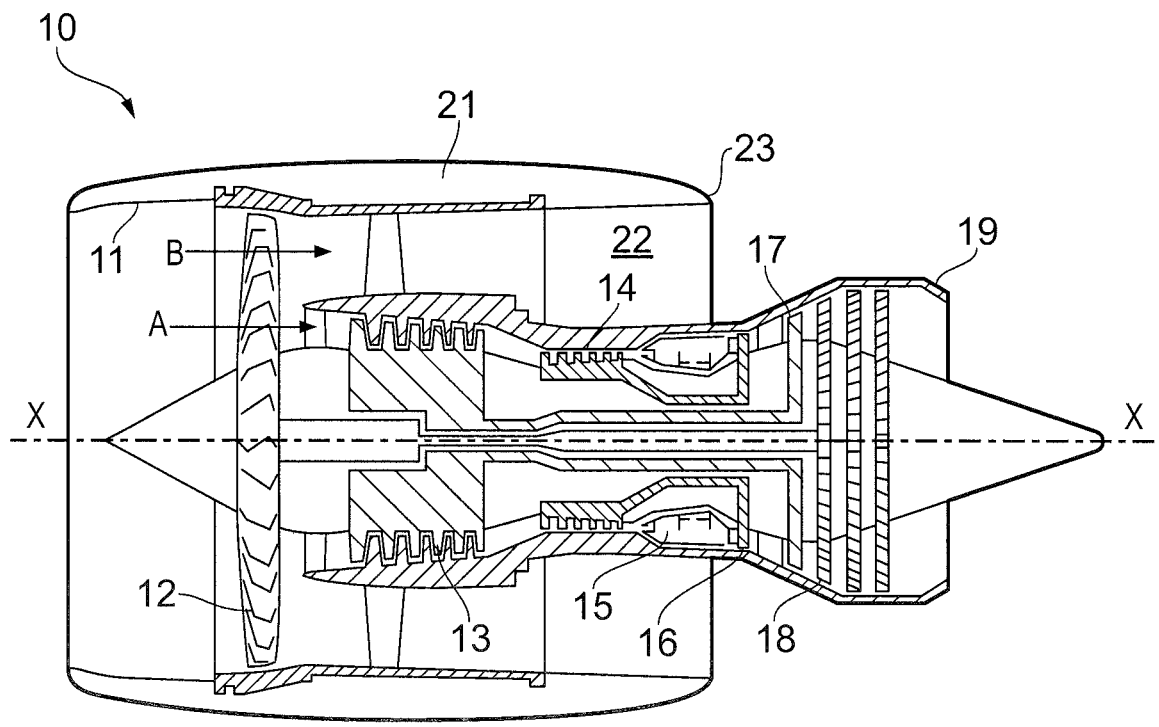
FIG. 1 shows a conventional gas turbine engine.

In a conventional leaf seal 210, the inner bore of the leaf pack is defined by the free ends 216 of the leaf elements 212 which act to provide a sealing surface against the rotating component 222. Normally, the rotating component 222 will be a shaft which is generally cylindrical. When assembled, the cylindrical inner bore of the leaf pack is concentrically aligned with the rotational axis 222a of the shaft 222. Hence, there is provided a circumferentially uniform and parallel sealing gap 230 between the surface of the rotating component 222 and the free ends 216 of the leaf elements 212. This is shown schematically in FIG. 4a.

However, in use, there are a number of operating variables (as listed in the background section above) which may result in the shaft 222 being axially offset with regard to the axis 222a of the inner bore of the leaf seal 210. Thus, in practice, the aerodynamic properties, performance and wear of the seal 210 can be operating outside the desired design envelope for portions of the operating cycle of the seal 210.

Figure 4B:
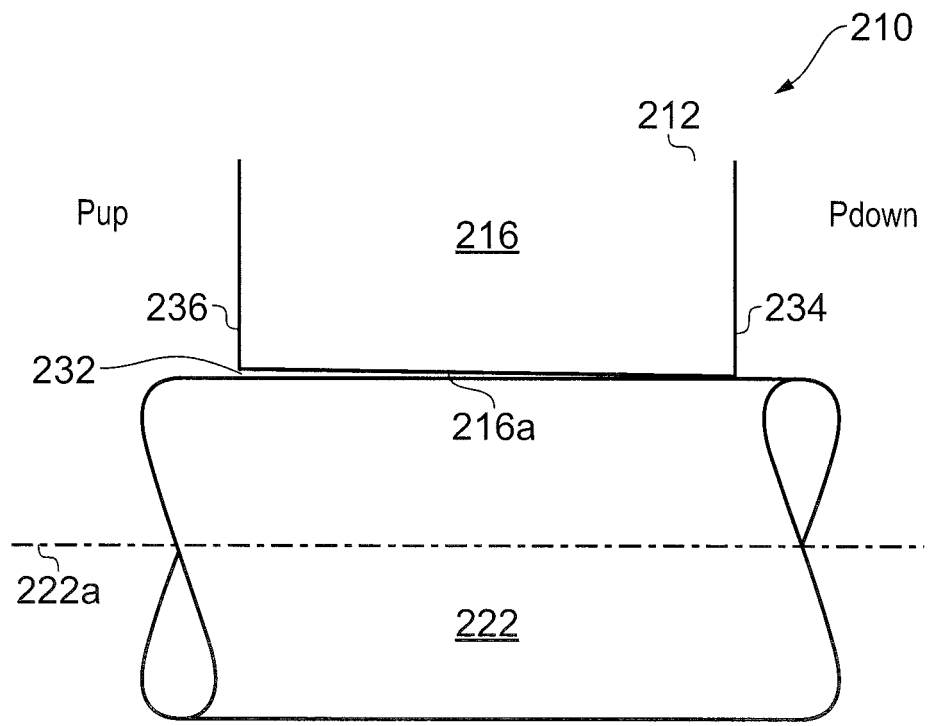
Figure 4C:
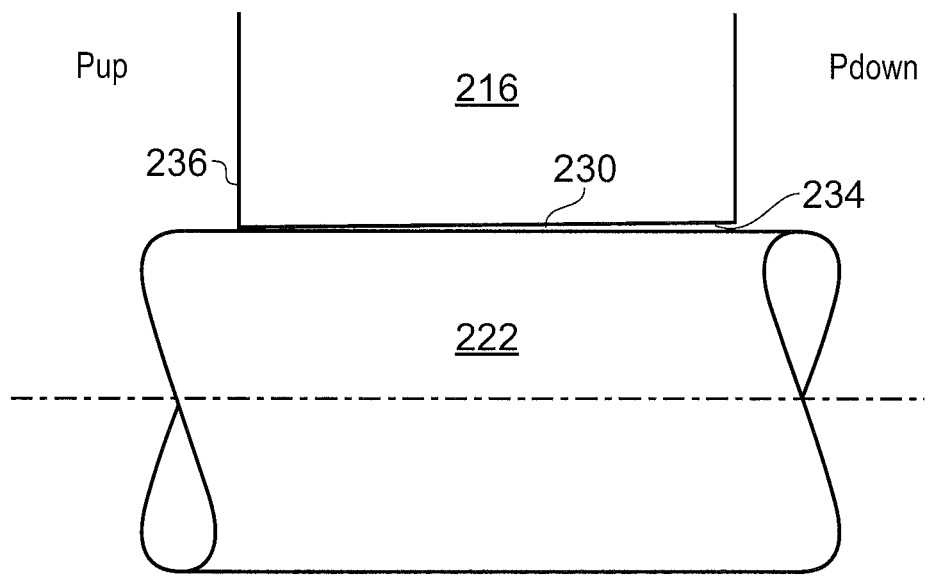

FIGS. 4b and 4c show two scenarios which may occur. The first of these is shown in FIG. 4b and involves a misalignment in which the upstream sealing gap 232 is increased and the leaf tip 216a pressure drop is presented predominantly at the downstream edges 234 of the leaf elements 212. This misalignment results in upstream hydrostatic pressure on the leaf tips 216a which provide uplift and a reduction in wear. Though potentially not ideal, this is generally a satisfactory outcome in the case of an unavoidable misalignment.

FIG. 4c shows the second scenario in which the misalignment is such that the sealing gap is increased at the downstream edge of the leaf elements 212. This results in the pressure drop being across the upstream side 236 of the leaf tips 216a and a reduction in the hydrostatic pressure experienced by the leaf elements 212. The reduction in hydrostatic pressure acts to suck the leaf elements 212 in toward the shaft which is generally detrimental to the operation of the seal 210 and the wear inflicted on the shaft 222 surface and leaf tips 216a.

Figure 2:
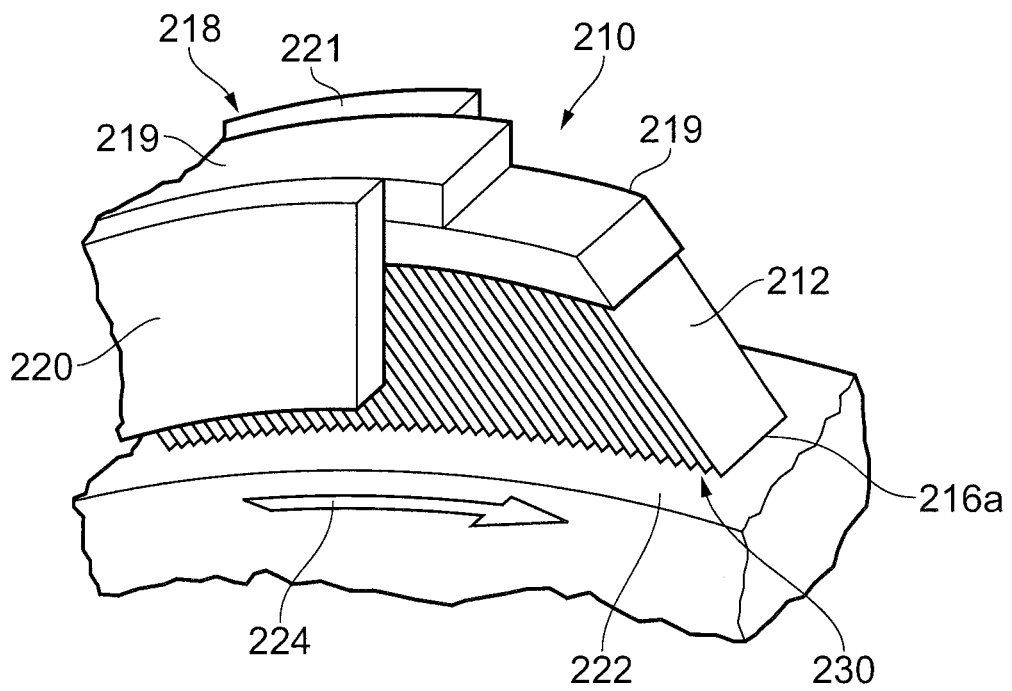
FIG. 2 shows a conventional leaf seal.
Figure 5:
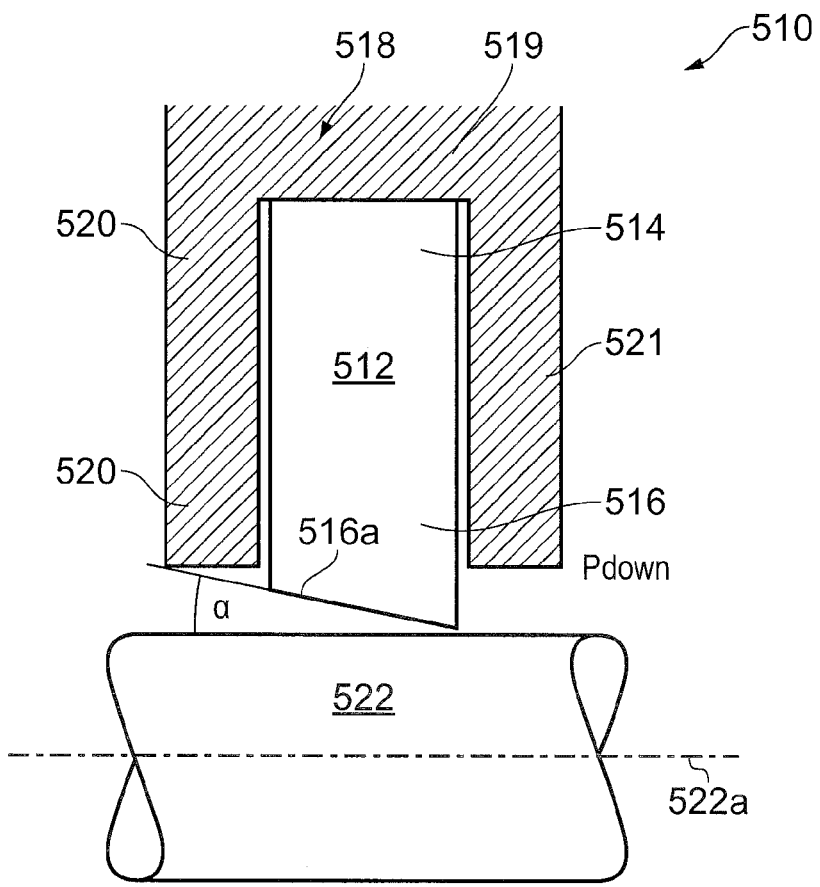
FIG. 5 shows a leaf seal according to the present invention.

FIG. 5 shows cross-sectional schematic view of a leaf seal 510 according to the present invention. The leaf seal 510 is described in more detail below but is largely similar to that described in relation to FIGS. 2, 3a and 3b. However, a significant difference of the seal 510 is that the free end edges 516a have been adapted to provide a leaf seal 510 which can accommodate some axial misalignment with a rotor 522 without the potentially deleterious effects caused by the reduction in hydrostatic pressure of known leaf seals 210.

Thus, there is shown a leaf seal 510 which includes a housing 518 to which is attached a plurality of leaf elements 512 in the form of thin compliant plates, of which only one is shown. Each leaf element 512 extends radially inwards from a fixed end 514 at the housing 518 towards a free end 516 which is proximate to the rotating shaft 522. The leaf elements 512 are presented in an annular array such that each leaf element 512 is inclined to the radial as previously described in connection with FIGS. 2 and 3a. The housing 518 is shown as comprising a backing plate 519 which can be attached to a stationary structure as required, an upstream high pressure cover plate 520, and a downstream low pressure cover plate 521. The primary purpose of the housing is to provide a fixture to which the leaves can be attached and other housing arrangements as known in the art may be used.

The free end edges 516a of the leaf elements 512 collectively define an inner bore which provides a sealing surface. The free end edges 516a of the leaf elements 512 in the described embodiment are generally straight and lie at an angle to the principal or neutral rotational axis 522a of the shaft 522 so as to provide tapered configuration. By neutral rotational axis 522a, it is meant the longitudinal central axis of the shaft 522 when not rotating or rotating under relatively benign conditions which do not lead to any significant transitory deflections.

The taper of the free end 516 is such that the sealing gap 530 is greater at the upstream side 536 of the leaf 516 and converges towards the downstream end 534. Thus, the sealing surface provided by the leaf elements 512 is conical rather than cylindrical as in known existing seals. As will be seen from the embodiments described below, the convergent sealing gap 530 can be provided by different configurations of leaf element 512 and shaft surface, some of which include continually curving free ends and some of which have discrete angled portions which are inclined by different amounts to the neutral rotational axis 522a.

The extent of the angle in the straight tapered free end is sufficient that the separating gap 530 will always be convergent under normal transient operating conditions. Thus, the seal 510 is designed by determining or estimating the ordinary transitory deflection of the rotary component 522 to provide an angle of expected deflection. And the seal 510 is provided with a taper angle which is greater than the expected deflection angle by a given margin. The margin can be used to allow for manufacturing or design tolerances, or to help provide a predominant operating condition such as a given amount of hydrostatic pressure during normal and transitory deflective behaviour.

Thus, the leaf tip taper ensures that any angular mismatch between the leaf inner bore and the rotor surface does not cause a change in the position of the closest point between the free end 516 of the leaf elements 512 and the rotor 522. This closest point is preferably at the downstream edge 534 of the leaf elements 512 such that the pressure drop is local to the downstream edge 534 in the tip region and that contact with the rotor 522, if and when it occurs, will be local to the downstream edge 534. This means that the upstream portion 536 of the leaf tips 516a are generally open to upstream fluid pressure which provides a hydrostatic lifting force to much of the free ends 516 of the leaf elements 512. This arrangement provides a consistent flow field under the leaf elements 512 and a reliable hydrostatic lift force at different operating conditions, and a leaf seal 510 which is less susceptible to aeroelastic forcing at the leaf tips 516a because the pressure drop at the leaf tips 516a is concentrated at the downstream edge 534 of the leaf tips 516.

Typical angular deflections in a gas turbine engine may be in the order of fractions of a degree. Thus, the taper angle α may be a minimum of 1 degree but may extend up to as much as 45 degrees. Preferably, the taper angle will be between 1 degree and 20 degrees to the neutral rotational axis. The angled portion of the leaf free end can extend from between 50% of the leaf axial width to 100%. Preferably the taper will extend over 80% of the axial width. More preferably, the taper will extend over 90% of the axial width. It will be appreciated that in some instances it may be preferable to provide a shorter taper such that the hydrostatic lifting force can be purposively reduced during steady state normal or transitory operating conditions.

Figure 6A:
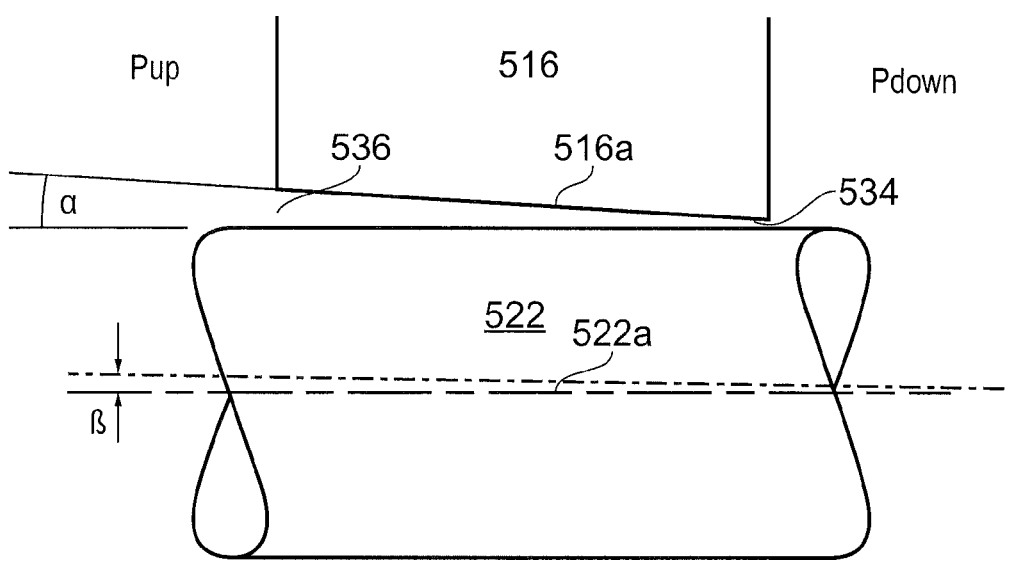
FIGS. 6a and 6b show a leaf seal of the invention in different operating conditions.
Figure 6B:
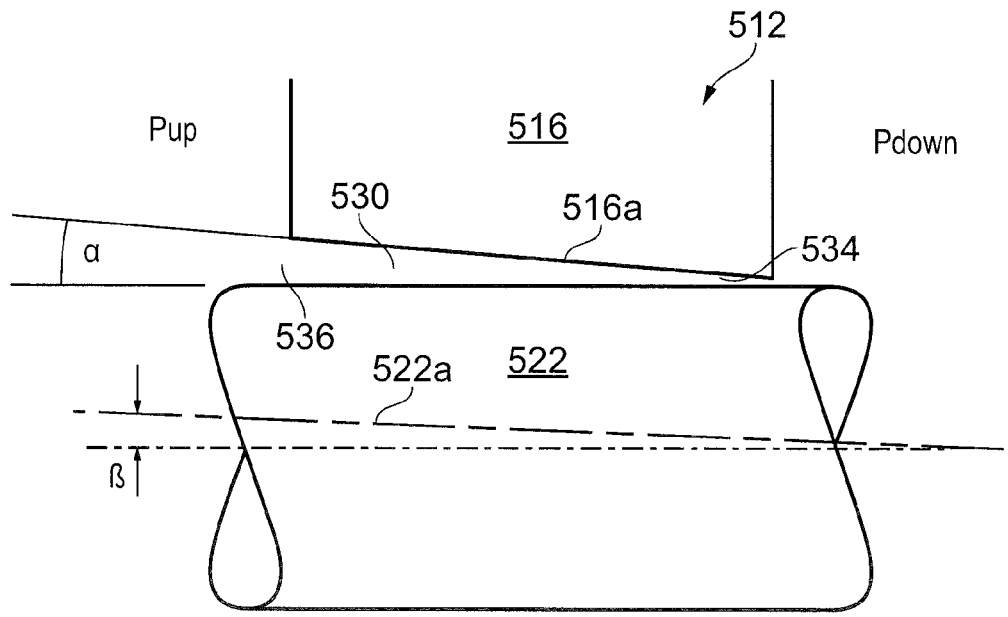

FIGS. 6a and 6b show two hypothetical deflection scenarios for a leaf seal 510 arrangement of the invention. In FIG. 6a, the angle of deflection β of the shaft 522 is positive in relation to the neutral axis 522 so as to reduce the gap at the upstream edge 536 of the leaf element 512. (The positive nomenclature is with reference to the neutral rotational and nominally chosen for the purpose of the description only). FIG. 6b shows a negative angle of deflection, −β, which increases the sealing gap 530 at the upstream edge 536. Thus, it can be seen that at the maximum positive and negative expected deflections there is a clear separation at the upstream edge 536 of the leaf element 512, and the narrowest portion of the sealing gap 530, and thus location of the majority of the pressure drop, is towards the downstream edge 534 of the leaf element 512.

It will be appreciated that only some of the leaf elements 512 in the annular array may have the taper angle α required to provide the desirous hydrostatic lift with other leaf elements having less or no taper angle (or convergence), relying on the lift provided by the tapered leaf elements 512 to reduce the contact pressure during a transient deflection event.

It will also be appreciated that the convergent gap 530 between the leaf free end edge 516a and the shaft 522 may be provided by having a profile on the shaft 522. Hence, the shaft 522 may be provided with a conical (and thus tapered in the section) section which is axially aligned with the leaf seal so as to radially oppose the free ends of the leaf elements 512.

Having multiple angled portions at the free end may be preferential in the case where a taper is included for another reason. For example, in WO06016098 there is described a leaf seal in which an upstream front corner of the leaf is removed so as to provide a deflection adjusting gap between the upstream cover plate and the upstream edge of the leaf to control blow-down forces under different operating conditions. UK patent application no. 1309579 describes other tapered leaf seal elements which provide other benefits. However, each of these, and many other leaf element configurations, could benefit from having a convergent sealing gap according to the present invention. The tapered portion spread over the leaf tip as described by this invention dominates the hydrostatic lift created under the leaf pack. Further, the hydrostatic lift can be provided without introducing significant stress raising features in the leaf by virtue of the tapered arrangement.

Figure 7:
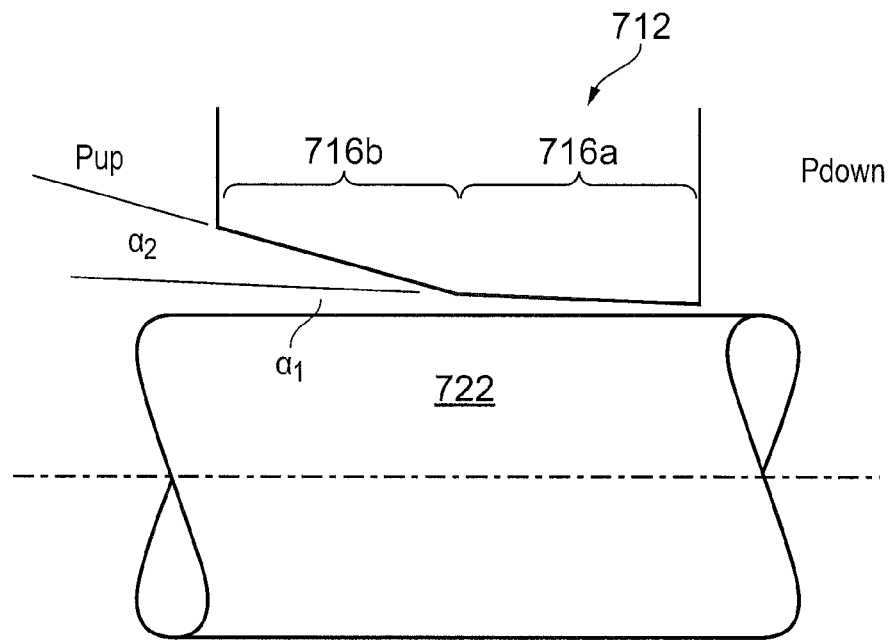
FIG. 7 shows a further embodiment of a leaf seal according to the present invention.
Figure 8:
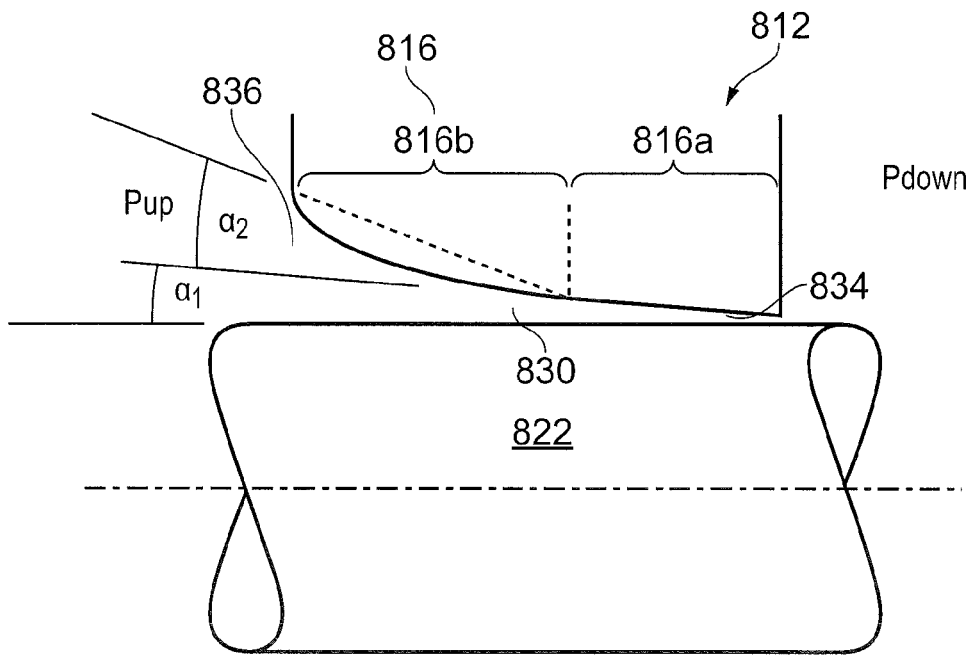
FIG. 8 shows a further embodiment of a leaf seal according to the present invention.
Figure 9:
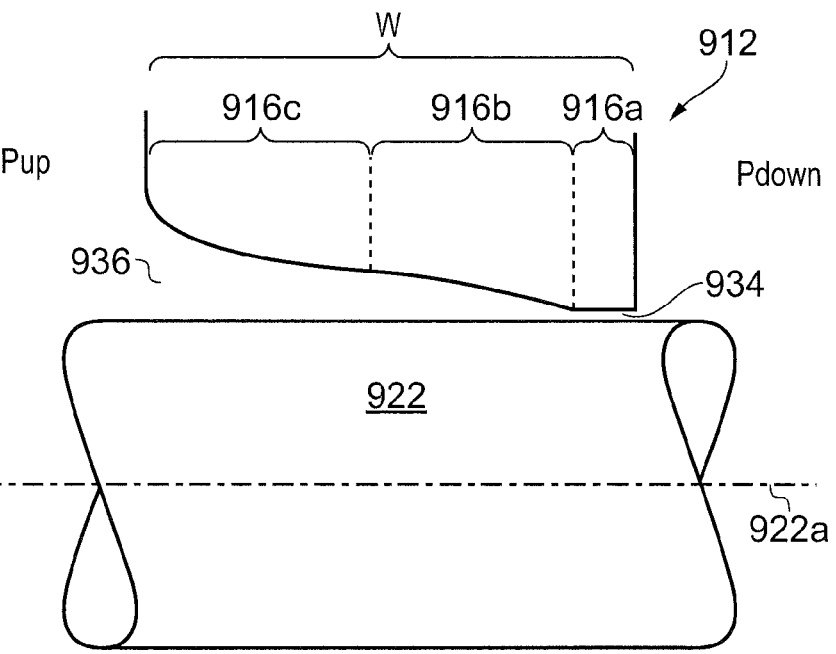
FIG. 9 shows a further embodiment of a leaf seal according to the present invention.

Alternative configurations of leaf elements can provide the required convergent sealing gap. FIGS. 7 to 9 give alternative examples.

FIG. 7 shows a leaf element 710 in which the free end 716 includes two discrete angled portions. Thus, there is a first downstream portion 716a having a taper angle $\alpha_1$, and a second portion 716b which extends from the first portion 716a to the upstream gap 736. The second portion 716b has a taper angle $\alpha_2$ which is greater than the downstream portion 716a. The values of $\alpha_1$ and $\alpha_2$ will be application specific but it is envisaged that $\alpha_1$ will typically be between 1 and 30 degrees with $\alpha_2$ between 5 and 45 degrees. Preferably, $\alpha_2$ between 1 and 30 degrees. Regardless, $\alpha_2$ will be greater than $\alpha_1$ to provide the necessary convergence.

FIG. 8 shows a leaf element 812 free end 816 which continuously curves from the downstream edge gap 834 to the upstream edge gap 836. The curve can be any suitable as defined by the application and the operating performance required. In the shown embodiment, the curve radius decreases from the downstream edge gap 834 such that the sealing gap 830 becomes increasingly large in the upstream direction. The curve may be defined by one whose second derivative is continuous and does not change sign (i.e. a curve that does not include a turning point).

Another way to quantify the curvature of the leaf element 812 in FIG. 8 would be to define two portions in which an imaginary line extends from the upstream to the downstream edge thereof, the lines having angles $\alpha_1$ and $\alpha_2$ with respect to the neutral rotational axis of the shaft 822.

In FIG. 9, the free end of the leaf element includes three portions. The first is a downstream portion 916a which is generally parallel to the neutral axis of the rotor 922a. The first portion 916a is relatively short, extending for only around a tenth of the axial width w of the leaf element 912. In other embodiments, the first portion may occupy a greater proportion of the axial width, however, too much will reduce the benefit of the invention as it will result a mid-leaf pressure barrier which is too far upstream of the downstream edge 934. This will result in a negative hydrostatic pressure during a negative shaft transient which will draw the leaf element 912 in toward the shaft 922. It is envisaged that the first portion will not extend beyond 20% of the axial width w of the leaf in the vast majority of cases and preferably will not extend beyond 10%. Nevertheless, there may be instances where the creation of some negative hydrostatic pressure on the leaf elements may be desirable.

The second portion 916b is axially upstream and in series with the first portion 916a and has a concave profile. The second portion 916b transitions into a third, convex, portion 916c through a broad point of inflection. The third portion 916c extends to the upstream edge of the leaf element 912.

It is to be noted that with all of the additional embodiments, the free end is generally configured to prevent a mid-leaf pressure barrier which can lead to a negative hydrostatic pressure, and include portions which are separated from the sealing surface to provide some constant hydrostatic pressure which can be useful for providing a stable leaf design.

The tip taper may be made by creating each leaf with a tip taper through pressing, stamping, etching, etc. or may be created by grinding or final machining the inner bore of a completed leaf seal (or leaf seal segment).

It will be appreciated that the above describe embodiments are exemplary and not limiting to the scope of the invention defined by the appended claims. For example, the leaf seal of the invention may find use in an application in which the two components do not rotate relative to each other. Further, the convergent sealing gap may be implemented with a profiled component, rather than a profiled leaf element free end. In some embodiments, the convergent leaf elements may be interspersed with no tapering leaf elements such that the hydrostatic lift is provided by a percentage of leaf elements within the leaf pack.

The invention claimed is:

1. A leaf seal arrangement, comprising:
   a first component having a high pressure area and a low pressure area therein;
   a second component which passes from the high pressure area to the low pressure area;
   a leaf seal having an array of leaf elements between the high and low pressure areas, each leaf element having a fixed end and a free end, wherein the fixed end is attached to the first component and the free end defines a sealing surface through which the second component sealably passes, a sealing gap therebetween;
   wherein the sealing gap generally converges from the high pressure area toward the lower pressure area; and,
   wherein the leaf elements have an axial width between the high pressure area and the low pressure area, the convergent portion of the sealing surface extending across between 60% and 100% of the width of the sealing surface.

2. A leaf seal arrangement as claimed in claim 1, wherein the second component is rotatably mounted relative to the first component and defines a neutral rotational axis, wherein the sealing gap is tapered and the angle of taper is between 1 degree and 20 degrees.

3. A leaf seal as claimed in claim 1 wherein the sealing gap converges at a constant rate.

4. A leaf seal as claimed in claim 1, wherein the sealing gap includes more than one convergent portions, each portion having different rates of convergence.

5. A leaf seal as claimed in claim 4, wherein the first portion which extends from the downstream edge of the leaf element and is inclined to the neutral axis by an angle $\alpha_1$ which is in the range bounded by 1 degree and 30 degrees, and the second portion extends from the first portion and is inclined to the neutral axis by an angle $\alpha_2$ which is greater than or equal to $\alpha_1$ and in the range bounded by 1 degree and 30 degrees.

6. A leaf seal as claimed in claim 5, wherein the profile of the leaf of the first or second portion is not straight and the angles $\alpha_1$ and $\alpha_2$ represent lines which extend from the respective upstream and downstream edges of the upstream and downstream portions.

7. A leaf seal as claimed in claim 1 having a downstream portion which is parallel to the surface of the rotating component.

8. A leaf seal as claimed in claim 7, wherein the downstream portion extends across less than 20% of the axial width of the leaf element.

9. A leaf seal as claimed in claim 1 comprising circumferential portions of convergent sealing gap and circumferential portions of non-convergent sealing gap.

10. A leaf seal as claimed in claim 1, wherein the convergent sealing gap is at least partially defined by tapered profile on the second component.

11. A leaf seal as claimed in claim 1, wherein the leaf seal is suitable for use in a gas turbine engine.

12. A gas turbine engine including a leaf seal as claimed in claim 1.

13. A method of providing a leaf seal for defining a high pressure area and a low pressure area in a first component in which a second component passes from the high pressure area to the low pressure area; the leaf seal having an array of leaf elements, each leaf element having a fixed end and a free end, wherein the fixed end is attached to the first component and the free end defines a sealing surface through which the second component sealably passes, a sealing gap therebetween, and wherein the sealing gap generally converges from the high pressure area toward the lower pressure area, the method comprising:
- determining the expected amount of deflection which will be experienced between the first and second components at the sealing gap during normal operation;
- determining a required amount of convergence in the sealing gap to accommodate the expected amount of deflection;
- configuring either or both of the leaf seal and the second component to provide the required convergence.

14. A method as claimed in claim 13, wherein the required convergence is greater than the expected deflection.

15. A method as claimed in claim 14, wherein the sealing gap is configured to provide positive hydrostatic lift under all normal operating conditions.

\* \* \* \* \*